United States Patent [19]
Dennison

[11] 3,904,307

[45] Sept. 9, 1975

[54] GAS GENERATOR TURBINE COOLING SCHEME

[75] Inventor: William T. Dennison, West Hartford, Conn.

[73] Assignee: United Technologies Corporation, Hartford, Conn.

[22] Filed: Apr. 10, 1974

[21] Appl. No.: 459,844

[52] U.S. Cl. .............. 415/115; 415/116; 416/92; 60/39.66
[51] Int. Cl.² ............................................. F01D 5/08
[58] Field of Search ..................... 415/115–118, 415/178; 416/92, 95; 60/39.66

[56] References Cited
UNITED STATES PATENTS

| | | | |
|---|---|---|---|
| 2,563,269 | 8/1951 | Price | 415/115 |
| 2,648,519 | 8/1953 | Campini | 415/115 |
| 2,988,325 | 6/1961 | Dawson | 415/115 |
| 3,043,561 | 7/1962 | Scheper, Jr. | 415/115 |
| 3,343,806 | 9/1967 | Bobo et al. | 415/115 |
| 3,356,340 | 12/1967 | Bobo | 415/115 |
| 3,452,542 | 7/1969 | Saferstein | 415/115 |
| 3,453,825 | 7/1969 | May et al. | 415/178 |
| 3,572,966 | 3/1971 | Borden | 416/95 |
| 3,575,528 | 4/1971 | Spears, Jr. | 415/115 |
| 3,602,605 | 8/1971 | Lee | 415/116 |

FOREIGN PATENTS OR APPLICATIONS 849,328 9/1952 Germany .......................... 415/178

Primary Examiner—C. J. Husar
Attorney, Agent, or Firm—Charles A. Warren

[57] ABSTRACT

An arrangement for cooling the high and low pressure rotors of a gas turbine, the rotors being independently rotatable on concentric axes, in which cooling air is supplied from a source downstream of the rotors through the low pressure rotor to the space between them and from this space to the blades thereon, and also to a space upstream of the high pressure rotor for cooling the face thereof.

7 Claims, 1 Drawing Figure

PATENTED SEP 9 1975　　　　　　　　　　　　3,904,307
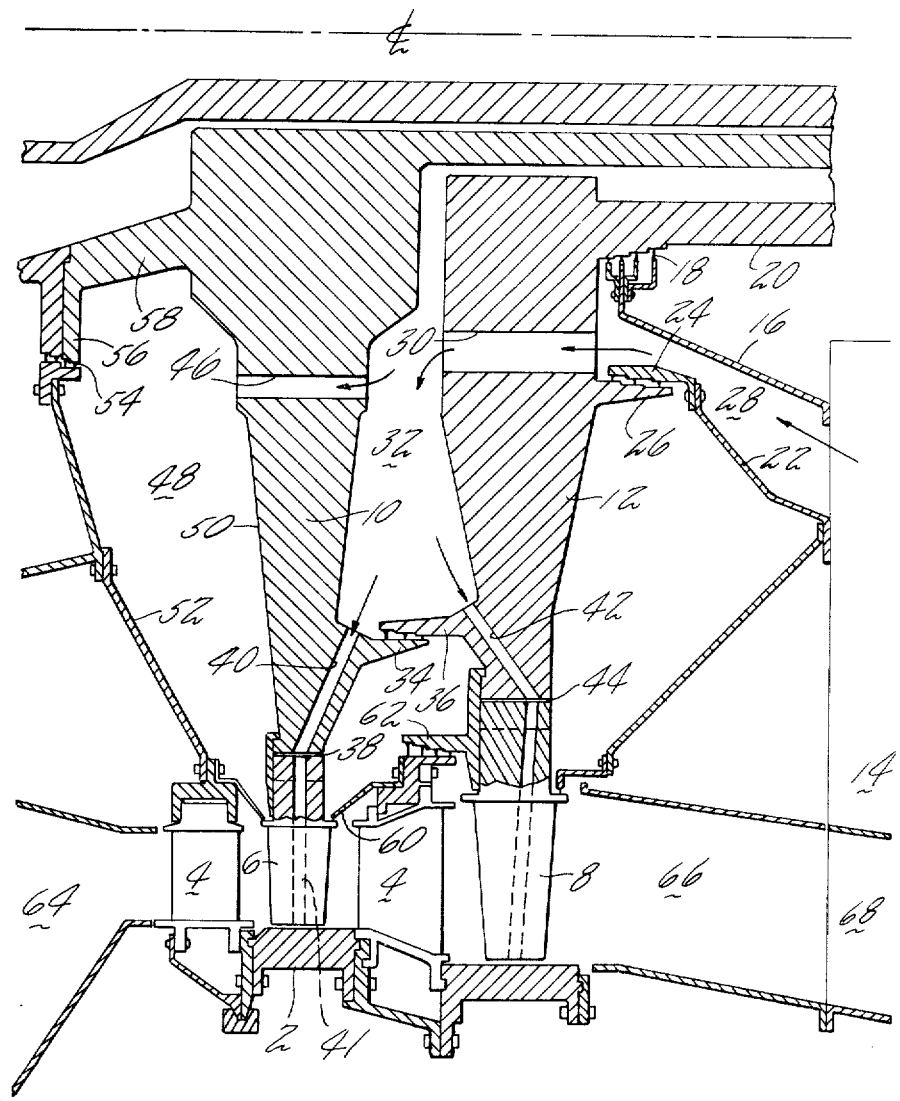

GAS GENERATOR TURBINE COOLING SCHEME

SUMMARY OF INVENTION

A feature of the invention is an arrangement for reverse cooling of the rotors by a flow of cooling air in a direction opposite to the flows of power gas through the turbine. Another feature is a delivery of cooling air to the blades on the rotors from the space between the rotors, assuring a pressure adequate to circulate the cooling air into the blades. Another feature is the flow of cooling air in such a way that the cooling air in its cooling process first encounters the least hot areas and as it becomes heated encounters hotter areas thereby minimizing the temperature differential between cooling air and parts to be cooled.

According to the invention the two turbine rotors which are independently rotatable receive cooling air from a compartment downstream of the low pressure rotor, this air passing through holes in the low pressure rotor into the space between the rotors. The air passes from this space into cooling passages near the periphery of the rotor leading to the blades theron. The cooling air from this space also passes through holes in the high pressure rotor to then flow over the upstream face of the rotor for cooling, with the pressure of the cooling air high enough to assure flow through the high pressure rotor, this air pressure will adequately cool the rotors and the blades thereon.

The foregoing and other objects, features and advantages of the present invention will become more apparent from the following detailed description of the preferred embodiment illustrated in the accompanying drawing.

BRIEF DESCRIPTION OF THE DRAWINGS

Single FIGURE is a sectional view through a two-stage split turbine showing the invention.

DESCRIPTION OF THE PREFERRED EMBODIMENT

Referring to the drawing, the turbine has a casing 2 supporting rows of vanes 4 therein, alternating with rows of blades 6 and 8 on the high pressure rotor 10 and low pressure rotor 12, respectively. These rotors are separately journaled for rotation on concentric axes in bearings not shown in a bearing support structure 14 downstream of the rotors. A suitable structure for the purposes shown and claimed in copending application Ser. No. 462,556 filed Apr. 19, 1974, now Pat. No. 3,874,811 having the same assignee as this application. The support structure carries a seal support 16 thereon, the latter having seal elements 18 on its inner periphery engaging the low pressure rotor 12 adjacent to the integral strut shaft 20 thereon. The support structure also carries another seal support 22 thereon spaced outwardly from seal support 16 and having seal elements 24 at its inner end cooperating with a sealing flange 26 on the rotor 12. Between the two seal supports is a chamber or compartment 28 to which cooling air is supplied by a suitable means not shown, as for example a supply of cooling air through the bearing support structure into the chamber.

The low pressure rotor has a row of axially extending holes 30 therethrough communicating with the chamber 28 on the downstream side and with the space 32 between the two rotors at the upstream end 31. The outer periphery of space 32 is defined by cooperating sealing flanges 34 and 36 on the high pressure and low pressure rotors, respectively. High pressure rotor 10 has a plurality of holes 40 extending from the blade root slots 38 therein at the periphery to the downstream side of the rotor inwardly of seal flange 34 and thus communicating with space 32. In this way cooling air flows from space 32 through holes 40 to the blade root slots, and thence through conventional radial passages represented by the dotted passage 41 in the blades 6 for cooling them.

Rotor 12 may also have similar holes therein extending from the base of the blade root slots 44 to the upstream side of the rotor 12 radially inward of seal flange 36 and thus communicating with space 32. Cooling air thus flows from space 32 through passages 42 to root slots 44 and around the roots or through conventional passages in the blades 8.

For further cooling high pressure rotor 10 has a row of axially extending passages 46 therethrough communicating with space 32 between the rotors and another space 48 upstream of the rotor 10. Cooling air passing through passages 46 from space 32 enters space 48 and flows over the upstream face 50 of rotor 10 thus further cooling this rotor. It will be understood that the cooling air in and passing through space 32 flows over and effectively cools the adjacent surfaces of rotors 10 and 12.

Since rotor 10 is hottest, the blades 6 thereon being exposed to the hottest gas in the turbine, and since the cooling air reaching the blades thereon and the upstream face has already been heated somewhat by rotor 12 and in contact with the walls of passages 46, the temperature differential between the cooling air and the rotor will be less but tends to be more nearly the same differential that the cooling air first encounters in chamber 28 and in rotor 12. By obtaining and maintaining a more nearly similar temperature differential throughout the turbine more effective cooling will be obtained.

Chamber 48 may be defined at its upstream side by a disk 52 extending from the inner ends of the first row of turbine vanes 4 and supporting seals 54 as its inner periphery cooperating with a flange 56 on a projection 58 on rotor 10. The detail construction of the turbine casing is not described as it is not a part of the invention and the additional sealing structures 60 and 62 supported by the second stage vanes 4 are also not described as they are not essential to the invention. It is sufficient for the invention to note that hot power gas enters the first stage turbine rows 4 from a duct 64, passes through the turbine and is discharged through a duct 66 through which the bearing support 14 is supported by struts 68.

Although the invention has been shown and described with respect to preferred embodiments thereof, it should be understood by those skilled in the art that various changes and omissions in the form and detail thereof may be made therein without departing from the spirit and the scope of the invention.

Having thus described typical embodiments of my invention, that which I claim as new and desire to secure by Letters Patent of the United States is:

1. A gas turbine construction including two axially spaced independently rotating concentric high and lower pressure turbine rotors, each having a row of blades on its periphery over which the power gas flows in its path through the turbine, a bearing support downstream of the rotors and a bearing for each rotor, a seal on the downstream side of the low pressure rotor, a seal structure extending from said bearing support to the adjacent low pressure rotor with the upstream edge cooperating with the seal on the rotor, said structure defining in cooperation with the rotor a chamber radially inwardly thereof to which cooling air is supplied under pressure, a row of axial passages through the low pressure rotor radially inwardly of the seal for a flow of cooling air from said chamber into the space between the rotors and substantially radial passages in one of said rotors from said space to the blades on said rotor.

2. A gas turbine as in claim 1 in which the high pressure rotor also has a row of axial passages therein for a flow of cooling air out onto the upstream surface of said high pressure rotor.

3. A gas turbine as in claim 1 in which said rotors have cooperating sealing elements near the periphery thereof to form an outer wall for the space between the rotors.

4. A gas turbine as in claim 1 in which other sealing means carried by the bearing support radially inward of the passages in the low pressure rotor extend to said rotor to define an inner wall of said chamber.

5. A gas turbine construction including axially spaced concentric turbine rotors each having a row of blades on its periphery, and defining a space therebetween, a bearing support downstream of the rotors, bearings for the rotors carried by the support, a seal flange on the downstream side of the downstream rotor, a seal structure extending from the support to the downstream rotor and cooperating with the seal flange, said structure defining with the downstream face of said downstream rotor a chamber to which cooling air is supplied under pressure, axial passages through said downstream rotor radially inward of the seal flange, for a flow of cooling air from said chamber through said passages into the space between the rotors, and other passages in one of said rotors from said space to the blades on the periphery thereof for delivery of cooling air to the blades.

6. A gas turbine construction as in claim 5 including other passages in the other rotor from said space to the blades.

7. A gas turbine construction as in claim 6 in which the blades in each row have roots engaging in slots in the periphery of the rotor, and said other passages in the rotors communicate with said slots.

* * * * *